Sept. 21, 1954 P. F. M. GLOESS ET AL 2,689,683

METHOD AND CARRY-OVER DEVICE FOR CORRECTING A CODED TRAIN OF ELECTRIC IMPULSES

Filed Jan. 16, 1950 3 Sheets-Sheet 1

Operative Process for Fig. 1

(Radix B = 2)

INVENTORS

Paul F. M. Gloess

Gerard J. R. Piel

BY Ralph B. Stewart

ATTORNEY

Sept. 21, 1954 P. F. M. GLOESS ET AL 2,689,683
METHOD AND CARRY-OVER DEVICE FOR CORRECTING
A CODED TRAIN OF ELECTRIC IMPULSES
Filed Jan. 16, 1950 3 Sheets-Sheet 2

Operative Process for Fig. 2
(Radix B = 2)

INVENTORS
Paul F. M. Gloess
Gerard J. R. Piel

BY Ralph B. Stewart
ATTORNEY

Operative Process of Fig. 1

Decimal (Radix 10) — Ternary (Radix 3)

INVENTORS
Paul F.M. Gloess
Gerard J.R. Piel

BY Ralph B. Stewart
ATTORNEY

Patented Sept. 21, 1954 2,689,683

UNITED STATES PATENT OFFICE 2,689,683

METHOD AND CARRY-OVER DEVICE FOR CORRECTING A CODED TRAIN OF ELECTRIC IMPULSES

Paul François Marie Gloess and Gérard Jean René Piel, Paris, France, assignors to Societe d'Electronique et d'Automatisme, Paris, France, a corporation of France Application January 16, 1950, Serial No. 138,792

Claims priority, application France January 19, 1949

4 Claims. (Cl. 235—61)

This invention relates to the converting or correction of coded electric signals in transmission systems of which the code is so set up that to each element of information to be transmitted there corresponds a numerical series of the form:

$$a_nB^n+a_{n-1}B^{n-1}+ \dots +a_kB^k+ a_{k-1}B^{k-1}+ \dots +a_1B^1+a_o$$

in which B represents the radix, being a number greater than unity arbitrarily chosen as the basis of numeration; $n, n-1, \dots k, k-1 \dots, 1, 0$ represent the order of the term of this series; and $a_n, a_{n-1}, \dots a_k, a_{k-1}, a, a_o$ are coefficients of a value less than B, so that if $a$ is unity, the term of the order 0 will be 1, the term of the order 1 will be B, . . . the term of the order $n$ will be $B^n$;

In such systems it is usual for each signal conveying one of these elements of information to be formed by means of a train of, preferably periodic, impulses, each impulse of the train corresponding to one term of the aforementioned series by reason of the fact that its sequence in the train gives an indication of the order of the term it represents, while its amplitude is proportional to the coefficient $a$ of that term.

Now, in such systems, it is generally necessary to provide combinations of several of these coded trains of impulses in the course of the transmitting operations, and to do so moreover at multiple points of the transmission chains; this is particularly, though not exclusively, the case in computer systems in which each element of information obviously is constituted by a number and in which the various elements of information must be confined for the realisation of methematical operations.

From such combinations there generally result superpositions of impulses between the trains in such a manner that, in the train representing the result of the superposition, the amplitude of the impulses (or at least of some of them), are of a higher level than the level of the radix; for example, an impulse of the order $k-1$ may have an amplitude $A_{k-1}$ equal to the sum $$a_{k-1}+a'_kB+a''_{k+1}B^2+ \dots$$

and therefore that impulse represents a term $A_{k-1}B^{k-1}$ which in effect equals the sum $a_{k-1}B^{k-1}+a'_kB^k+a''_{k+1}B^{k+1}+ \dots$. Since an impulse of the order $k-1$ (by its sequence in the train) no longer repreesnts a term of the order $k-1$ of the form of numerical series chosen for the setting up of the code, the encoding of such a train can and must be considered as incorrect.

This error can be expressed by saying that such a train of impulses represents the "gross" result of an operation whereas, when converted it will represent the "net" result thereof.

The present invention has for an object to provide a method of and means for automatically converting any "gross" result of this kind into a "net" result by automatically carrying over, from one order to the next, terms of a higher order which may be implicitly contained in a term of a lower order; since such a conversion in a calculation constitutes a carry-over process, the circuits which effect this process will hereinafter be referred to as "carry-over operators" without, however, such reference implying any limitation to their use in computer systems alone.

It may be noted here that it would of course be possible in a computer or other transmission system operating with coded trains of impulses of the type defined to tolerate the existence, and hence the propagation through the system, of coded trains which only represent gross results up to the eventual reception of the signal representing the gross total, the latter signal alone being subjected to conversion. It will be appreciated, however, that, in the interest of flexibility and homogeneity of the design of the operating and transferring circuits and circuit elements incorporated in the system, it is in practice preferable to effect such corrections at each place where a train of impulses representing the gross result of an operation may appear, thereby maintaining the maximum amplitude level of the impulses throughout the chain of transmission at the maximum value of the amplitude level of the radix adopted, which value may be chosen in order to avoid any dangerous distortion of the coded signals due to overloading in the course of their utilisation.

The method according to the invention of converting or correcting the presentation of an incorrectly coded train of electric impulses of the kind (hereinafter called "the kind referred to") in which each impulse represents, in sequence and amplitude, one term of a numerical encoding series having as its radix a value B greater than unity and having the form $$a_nB^n+a_{n-1}B^{n-1}+ \dots +a_1B^1+a_o$$

consists in analysing the amplitude of each impulse in the sequence of increasing orders, with reference to the amplitude level of radix B, and, every time when said radix level is detected by the analysis, substituting for the impulse analysed an impulse of amplitude diminished by said radix level and simultaneously generating an impulse of unit amplitude, and adding the impulses of unit amplitude so generated to the incoming impulse of the next higher order of the train, for which this process is repeated, and so forth from order to order until the whole train has been converted or corrected.

Accordingly, a carry-over operator for use in performing this method may comprise means for analysing each impulse of a train with reference to the amplitude level of the radix, and for detecting, by such analysis, the amplitude levels of impulses which are at or higher than said radix level, means for generating, in response to the detection of such a radix or higher level, an impulse of amplitude B and an impulse of unit amplitude, means for subtracting said impulse of amplitude B from the impulse analysed, and means for adding said impulse of unit amplitude to that impulse of the train next higher in order than the impulse analysed, prior to the operation of analysing that impulse of higher order.

With a view to carrying into practical effect such carry-over operators and in order to correct incorrectly coded trains comprising pulses the amplitude of which can reach a plurality of integral multiples of the radix B amplitude, they may be constituted, by combinations of elementary carry-over operators each incorporating all of the aforementioned means but functioning only on an "on-off" principle with respect to a predetermined level (a level of radix B respectively or an integral multiple thereof); to this end, said analysing means of each elementary carry-over operator may be adjusted to operate with a predetermined threshold of operation, their respective means for generating the impulses of amplitude B and the impulses of unit amplitude being adapted to generate only one impulse of each kind.

In one form of such a combination of elementary carry-over operators, each working on the "on-off" principle with respect to the level of radix B, such elementary carry-over operators are connected in cascade in a number equal to the integral excess value of the number $$\frac{NB}{B-1}-1$$

where N designates the greatest multiple of the level of radix B liable to appear in the result, to be corrected, of a previous combination of coded trains of impulses.

In another form of combination of such elementary carry-over operators working on the "on-off" principle with respect to the radix level and its integral multiples, and each having its threshold adjusted for one of these level values, the elementary carry-over operators are connected in parallel in a number equal to 2N, where N designates the greatest multiple of the level of radix B liable to appear in the result, to be corrected, of a previous combination of coded trains of impulses.

Other forms of combinations of such elementary carry-over operators can of course be derived from the foregoing two principal forms by the choice of any cascade-parallel combination suited to the particular problems of correction of coded trains which may arise owing to the appearance of various multiplicities of level in a gross operating result; thus, in the case where the number of levels of a gross result is substantial, several parallel networks of elementary carry-over operators according to the second form set forth above may be connected in cascade, each network constituting what may be called a "partial carry-over operator," in which case one of the partial carry-over operators of this cascade chain may consist of a single elementary carry-over operator working on the "on-off" principle with respect to the level of radix B. Thus, in the case of complex operations also, such as the simultaneous addition of several coded trains, partial carry-over operators may be connected so as to effect preliminary additions of several trains, the definitive addition being realised by a final partial carry-over operator acted on in parallel by the partial carry-over operators which effect preliminary additions of the trains.

Considering now the operation of an elementary carry-over operator of the above-specified kind, one may say that the train of impulses, incorrectly coded, the pulses of which are sequentially submitted to the amplitude analysis referred to, results from the combination, i. e. the addition, of an incoming pulse train of variable amplitude, in which pulses represent incorrectly set numbers, and of at least a partial carry-over pulse train of unit amplitude. One may as well say that the pulse train issuing from an elementary operator is, in a like manner, the result of the combination, i. e. the subtraction, of said combined pulse train and of a cancellation pulse train, having the same distribution in time of pulses as said carry-over pulse train, but of radix amplitude.

According to the present invention, said carry-over pulse train and said cancellation pulse train are simultaneously derived, through a voltage amplitude reduction process, from a control pulse train of uniform arbitrary amplitude higher than radix amplitude and in which pulses occur only at such time intervals as pulses equal to and higher than radix amplitude (or an integral multiple of said radix amplitude) occur in the resultant pulse train submitted to the amplitude analysis. Said control pulse train is formed by amplifying to such a uniform higher-than-radix-amplitude said resultant pulse train in an amplifier stage so biassed as to discriminate against pulses of amplitude lower than said radix amplitude (or lower than said integral multiple of radix amplitude). Said cancellation pulse train is reapplied without delaying to said resultant pulse train to produce a pulse train in which pulses having an amplitude equal to and higher than said radix amplitude (or said integral multiple of radix amplitude) in said resultant train, are then reduced in amplitude by said radix amplitude. Said carry-over pulse train is added to said incoming train with a time shift equal to the period of the pulses of said incoming pulse train.

Such a time shift of the carry-over pulse train may be obtained, according to a further feature of the invention, as well by delaying said resultant pulse train prior to its selective amplification of pulses, in which case the carry-over pulse train is shifted by its undelayed application to said resultant train prior to its delaying, as by effectively delaying said carry-over pulse train when said resultant train is directly submitted to said selective amplification when formed.

The amplifier stage concerned in the derivation of the control pulse train may be a conventional Class C amplifier with an operating threshold adjusted to an amplitude value lower than radix amplitude, or lower than an integral multiple of said radix amplitude, but higher than radix-minus-one unit amplitude, or higher than an integral multiple of radix-amplitude-minus-one unit, so as to remain blocked (choked) when said threshold amplitude is not attained by an incoming pulse and to be unblocked (unchoked) when an incoming amplitude of higher level than said threshold is met. In the latter case, it appears in the output of the stage an amplified pulse which will be, in any case, of a higher amplitude than radix amplitude. The plate characteristic of said stage is further so chosen that the amplitude of the pulse thus delivered is always of a definite arbitrary value, higher than said radix value, irrespective of the actual difference at the input between the threshold amplitude and the true amplitude of an unchoking pulse. Then, both the unit amplitude carry-over pulse train and the radix amplitude cancellation pulse train can be derived in a simple way from said control pulse train, by applying said train to two separate resistors, so adjusted as to reduce said arbitrary higher-than-radix-amplitude to said unit amplitude and to said radix amplitude, respectively.

Such a method of generating the carry-over and cancellation pulse trains in elementary carry-over operators according to the present invention is in no way restricted to any particular kind of numeration radix adopted: it is clear that said control pulse train will be derived from pulses of said resultant train to present uniform amplitude of pulses irrespective whether a number of intermediary amplitude levels corresponding to sub-multiples of said radix amplitude exist above the threshold value of said amplifier stage.

Further it is to be noted that, in such a method of deriving a control pulse train, the pulses of said control train are not truly derived from the pulses of the analysed pulse train but, to some degree, are regenerated from the operative pulses of said analysed train. Such a regeneration may be increased by applying a timing train of pulses on a grid of the amplifier tube, as well known per se, if time regeneration, as well as the recalibration prior obtained, is desirable.

A recalibration of the pulses of the analysed train in view of the output combination may also be advantageous. According to a further feature of the invention, for this purpose, alternative embodiments of elementary carry-over operators are also provided which include such recalibration means, comprising similar threshold amplifier stages with a plate limiting characteristic, and a voltage dropping resistor in their plate circuits: said stages are interposed in parallel connection in the transmission path of said resultant train from the combination of an incoming pulse train and a carry-over pulse train, their thresholds being adjusted according to the complete scale of unit amplitude levels which may appear in said resultant train. All pulses delivered are of a definite arbitrary amplitude, higher than, at least, unit amplitude, and their voltage drop resistors reduce said arbitrary amplitude to unit amplitude. In such arrangements, it is clear that such a threshold tube will act at the same threshold level as the stage otherwise provided for the derivation of said control pulse train. Consequently, it is then provided, according to a further feature of the invention to dispense with such a stage in the transmission path of the train analysed, which automatically results in a reduction by a unit amplitude of all the pulses of said train which are at or higher level than the analysis level amplitude; hence, in such a scheme, the cancellation pulse train will merely be of radix-minus-one unit amplitude instead of radix amplitude.

The invention will now be described in detail in the following description of the attached drawings. Unless otherwise stated, no limitation of system of numeration is to be considered.

Figure 1:
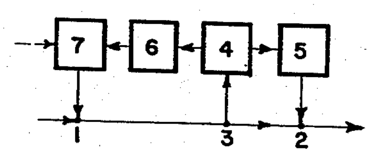
Fig. 1 is a block diagram showing an elementary carry-over operator according to the present invention.
Figure 1A:
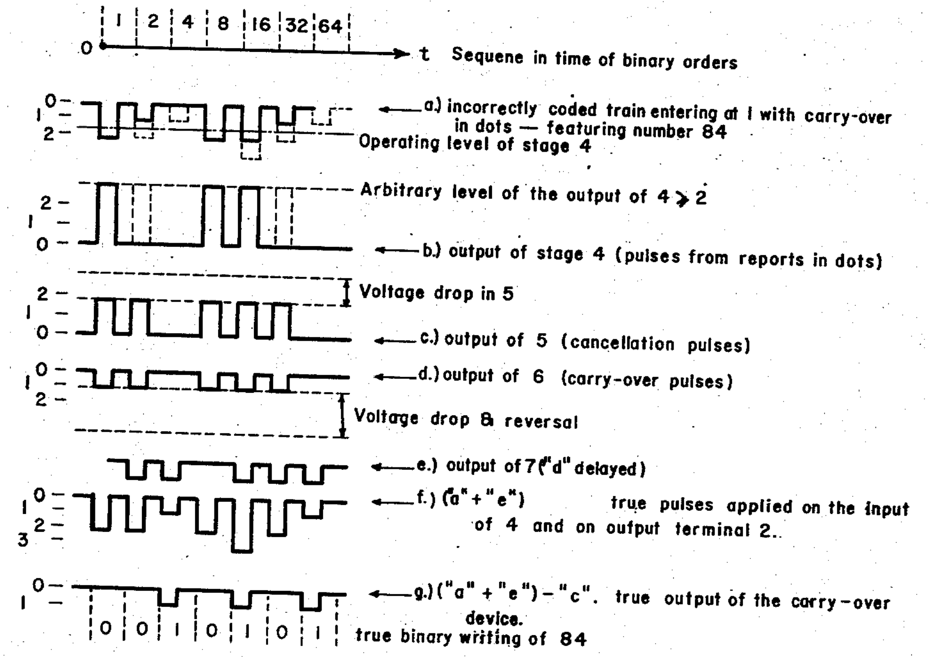
Figure 2:
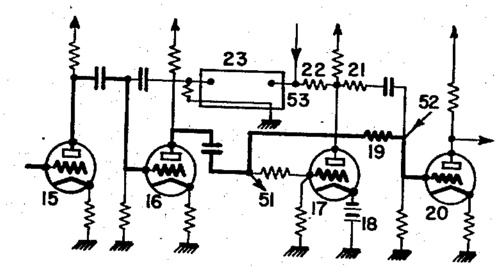
Fig. 2 is a circuit diagram illustrating one embodiment of the carry-over operator of Fig. 1.
Figure 2A:
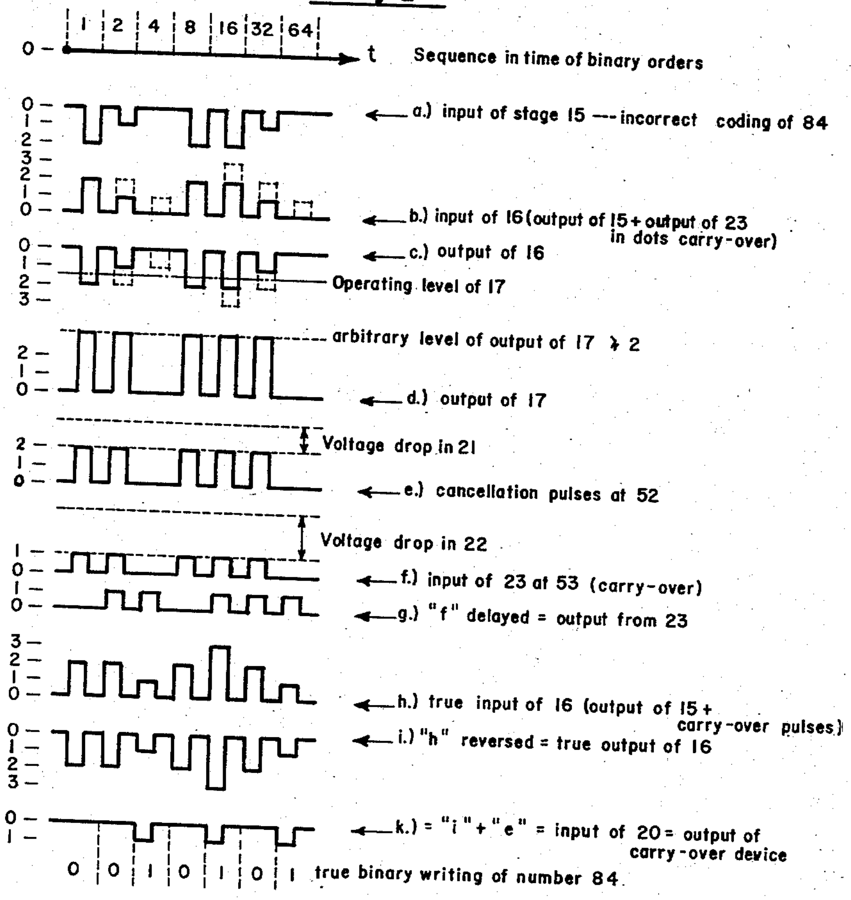
Figures 1, 1C:
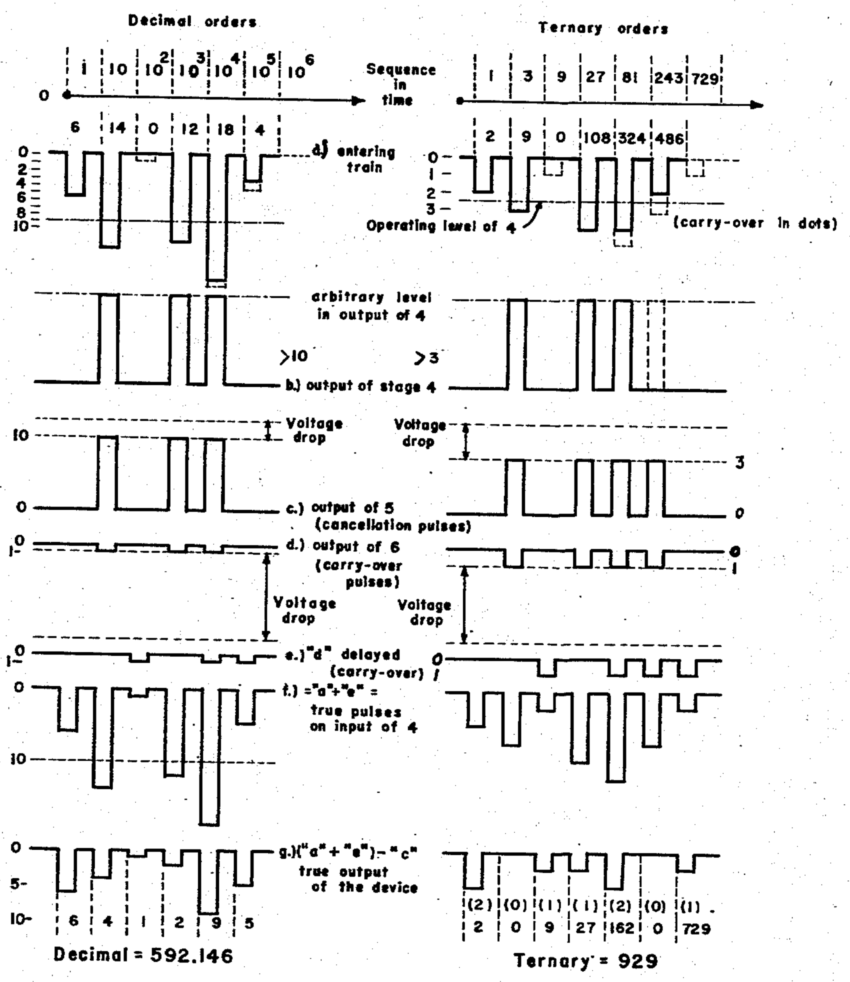

Figures 1*a*, 1*b*, and 1*c* are pulse diagrams illustrating the operation of Fig. 1 according to 3 different numeration systems; and Fig. 2*a* is a pulse diagram illustrating the operation of Fig. 2 according to the binary numeration system.

In the diagram of Fig. 1, a coded train of impulses is applied to the input point 1 of a direct impulse-transmission channel, the output point of which is indicated at 2. At a point 3 of this channel, a branch line applies each impulse of the train to a threshold amplifier stage 4. The latter is adapted to respond every time the amplitude of an impulse applied thereto reaches or exceeds the level of radix B; upon response delivers a pulse of arbitrary amplitude higher than the radix amplitude to voltage drop resistors circuits 5 and 6. An impulse of amplitude equal to the radix level but of opposite sign to that of the impulse transmitted through the direct channel, is applied through the circuit 5 to the output circuit at point 2 where it is subtracted from the impulse analysed which therefore leaves this circuit with an amplitude level diminished by the level B. The resistor circuit 6, on being fed by the detector 4 transmits an impulse of unit amplitude (i. e. of level $1/B$ with respect to the impulse generated by the impulse-producer 5); this impulse of unit level is applied to a delaying circuit 7 which stores it and only applies it to the input circuit at point 1 at the instant when the next following impulse of the train arrives, and then with such a sign that it becomes added to that impulse; thus the carry-over is effected to the impulse next higher in order to the impulse which has just been analysed.

The delaying circuit 7 may be constituted simply by a time-delay circuit in cases where the period of the coded train of impulses is regular or, in other words, if all impulses of the train (including the impulses of zero amplitude) are uniformly spaced in time by a given interval which will herein be designated T. If that period is irregular the train of impulses will generally be associated with a train of pilot impulses, each pilot impulse preceding a code impulse; in that event, the element 7 may consist of a triggered device such as a double-stability circuit of the kind sometimes known as "flip-flop" circuit which in changing from one stable condition to another delivers an impulse to one of its outputs, and such flip-flop device, having a condition prepared by the application of any impulse coming from the impulse-producer 6, will be actuated by the pilot impulse which precedes the impulse of the train following the impulse which has been analysed.

The operation of Figure 1 is further illustrated in Figure 1*a* in which the incoming train of pulses is shown in *a*. This train is formed of a series of pulses intended to represent the number 84 in the binary system, but the pulses are not arranged in the proper time intervals and are not of the proper amplitude. This incoming pulse train may have been formed by the addition of two separate trains in a multiplying operation of two factors of the number 84. The purpose of the invention is to reform the pulse train shown at *a* in the correct binary form for the number 84, as shown at *g*.

Stage 4 of Figure 1 amplifies only those pulses which exceed the threshold level of this stage. These are the pulses which extend below the dot-dash line in curve *a*, and the amplified pulses at the output of stage 4 are shown at *b*. These pulses are of a uniform level which exceed the radix level of two units.

The cancellation pulses supplied to output terminal 2 through stage 5 are shown at *c*. These pulses are of radix amplitude of two units. The carry-over pulses supplied from stage 6 to the delay stage 7 are represented at *d*, these pulses are of unit amplitude and are reversed in polarity with respect to the cancellations pulses. The delayed cancellation pulses applied from stage 7 to input terminal 1 are shown at *e*. Curve *f* represents the pulses applied to the input of stage 4 by the combined trains *a* and *e*. Curve *g* represents the pulses which appear at the output terminal 2 as a result of the action of the cancellation pulses *c* upon the combined pulses *f*. The output pulses *g* are of unit amplitude and are properly positioned to represent the number 84 in the binary system.

Fig. 2 shows a possible layout for carrying into effect the elementary carry-over operator of Fig. 1, in which a coded impulse train resulting from the combination of two trains only is applied to an input combining circuit constituted by two stages of electron tubes 15 and 16 having high cathode negative feed-back which stabilises their gain and is better adapted to preserve the scale of elementary levels existing in the input impulse; the reversing stage 15 changes the polarity of the input impulse and the reversing stage 16 re-establishes its original sign and applies it to an electron tube 17 which, by virtue of its cathode bias 18, fulfils the function of radix level detector and, simultaneously, the function of impulse-producer at each detection of said level. At the same time the impulse at the output of stage 16 is transmitted via an adjusting resistor 19 to an output tube 20 also having a high cathode negative feed-back.

The impulse resulting from the application of an input impulse having a level of two units (if we are considering the case of a radix equal to 2) to the radix level detector tube 17 has its peak removed by the plate current characteristic of this tube and is simultaneously applied with an amplitude higher than radix to two resistors 21 and 22. The resistor 21 is adjusted to such resistance value that the impulse voltage at its output terminal has an amplitude equal to the radix level; said impulse has evidently a polarity which is opposite to that of the impulse applied via resistor 19 to the grid of tube 20. The connection of the resistor 21 to the input side of the output tube 20 therefore produces the subtraction of the radix level from the impulse analysed.

The resistor 22 is made of such resistance value that the voltage of the impulse passing therethrough is reduced to a unit value at the output terminal of the resistor. This unit impulse of negative sign is applied to a delay line 23 so designed as to subject it to a delay equal to the time interval T between two impulses of the periodic train. The output of the delay line 23 is applied to the grid of the second tube 16 of the input combining circuit, and accordingly, the delayed impulse of unit amplitude level becomes effectively added to the next following impulse of the train because the sign of that next impulse is likewise negative at that point of the input combining circuit. The carry-over has thus been effected.

If desired, partial regeneration of the impulses may be brought about for example by feeding on to a screen electrode of the tube 20 synchronous signals which are applied to that screen with positive sign. The various electron tubes may, of course, be pentodes, the triode form shown having only been adopted in order to simplify the drawing.

The operation of Fig. 2 may be explained as follows:

Tube 17 is adjusted by means of polarizing source 18, to respond only to impulses of a level equal to or greater than that of a level determined by a prior arbitrary choice of a level value corresponding to the chosen numeration basis. For simplicity, B will be the arbitrary amplitude level.

When an impulse appears on the input of tube 17 with an amplitude level greater than its polarization threshold, this tube develops, on its plate, an impulse of arbitrary amplitude, of a level greater than level B. Resistor 21, through drop of voltage applies a voltage of level B to the point 52. Resistor 22, through drop of voltage applies a voltage of unit level at point 23. The only two levels to be considered for adjustments are therefore 1 and B.

Assume now that an incoming impulse is applied on to the grid of tube 15. This impulse is reversed in polarity by tube 15 and is applied to the grid of tube 16, reversed again and appears at point 51. From this point it is applied on to the grid of tube 17 and simultaneously through the mixing resistor 19 to point 52.

If that impulse is of a level below the threshold of tube 17, no impulse voltage appears on the plate of this tube, and only the impulse applied through resistor 19 reaches the grid of the output tube 20.

If the impulse applied to tube 17 is of a level above that of the polarization threshold, tube 17 delivers from its plate an impulse of arbitrary level above the value B and of constant level regardless of how much the amplitude of the incoming impulse exceeds the value B.

The impulse outcoming from tube 17 is of course of a reverse sign to that of the impulse supplied through 19 to point 52. The latter pulse reduced to level B through drop of voltage in resistor 21, is thus subtracted at 52 from the impulse supplied by resistor 19. Therefore, a blanking or cancellation of the amplitude level B, in the coded train impulse, takes place at point 52. At the same time, resistor 22, through drop of voltage of the outgoing impulse from tube 17, supplies an impulse of unity level to point 53 and this impulse is delayed by line 23 by a period of time equal to that of interval between two successive pulses of the incoming train.

The delayed impulse at the output of line 23 is fed back to the grid of tube 16 with the same polarity as the incoming impulse.

If, at the instant when the carry-over impulse is applied to stage 16, it does not meet any incoming impulse, it is reversed by stage 16 but does not operate stage 17.

If, at the instant when the carry-over impulse is applied to stage 16, it meets a new incoming impulse, they both automatically add, and the combined impulse thus constituted is reversed in 16 and appears on to stage 17 as an incoming impulse of a level B or greater.

The operation of Fig. 2 is further illustrated by the pulse diagrams shown in Fig. 2*a*. The various pulse curves shown in this figure represent the pulses appearing at different points in Fig. 2, as clearly marked on the drawing. The input pulse train at *a* is an incorrect coding of the No. 84 and is the same as the input train *a* in Figure 1*a*. The remaining pulse curves shown in Fig. 2*a* need no further explanation in view of the previous explanation of Fig. 1*a*.

Where there are a number of different radix levels to be detected, it is sufficient to branch off the input impulse several times at the point 51 to take it to as many threshold amplifier stages and associated voltage drop resistors connected in parallel as there may be levels contained in the analysed impulses after the carry-over has been effected, the impulses of radix level generated by the operations of the various radix-level detectors being all reapplied, with negative sign, at the point 52 of this circuit, and the impulses of unit level, which correspond to the quantities carried over, being jointly reapplied at the point 53 to the input to the delay line 23.

In operator circuits according to the present invention, the circuits described need not be modified in order to have them operate in different numeration systems, it is necessary only to adjust the polarization of the threshold of tubes 17 to the voltage B, 2B etc. which may be different from one numeration system to the other; in this way, these operators operate for any base of numeration system.

In operator circuits according to the arrangements shown in Fig. 2, it is however necessary to introduce as many paths between point 21 and points 52 and 53 as there are unit levels or as there are multiples of $B-1$ to $2B-1$ etc.

The pulse diagrams shown in Fig. 1*b* illustrate the operation of Fig. 1 when applied to the decimal system of numerals for correcting an incoming pulse train representing the No. 592,146.

The pulse curves in Fig. 1*c* represent the operation of Fig. 1 when applied to the ternary numerals system for correcting an incoming pulse train representing the No. 929.

What we claim is:

1. The combination of an input circuit, means for applying to said input circuit at least one incoming train of number-representative pulses of a plurality of amplitudes related to an arbitrary unit amplitude and to an arbitrary multiple-unit radix amplitude and means for applying to said input circuit, in the same polarity, a train of unit amplitude pulses shifted in time from said incoming train by a time interval equal to a period of the pulses of said incoming train, in order to produce a resultant train of pulses of added amplitudes, means controlled by said input circuit for amplifying to a uniform amplitude higher than radix amplitude the pulses of said resultant train through an amplifier tube so biased as to discriminate against pulses which are of lower amplitude than said multiple-unit radix amplitude or lower than a definite multiple of said multiple-unit radix amplitude, an output circuit having an input mixer, two resistors in parallel paths connected to the plate circuit of said tube, one of said resistors being of such a value as to reduce to unit amplitude said higher amplitude pulses and being connected to apply unit amplitude pulses to said input circuit, the other of said resistors being of such a value as to reduce to radix amplitude said higher than radix amplitude pulses and being connected to said input mixer of said output circuit, and means for also transferring to said input mixer of said output circuit said resultant pulse train of added amplitudes, so as to produce an outgoing pulse train of subtracted amplitudes.

2. The combination of an input circuit, means for applying to said input circuit at least one incoming train of number-representative pulses of a plurality of amplitudes related to an arbitrary unit amplitude and to an arbitrary multiple-unit radix amplitude and means for applying to said input circuit, in the same polarity, a train of unit amplitude pulses shifted in time from said incoming train by a time interval equal to a period of the pulses of said incoming train, in order to produce a resultant train of added amplitudes, a treshold circuit connected to said input circuit and being so biased as to discriminate against pulses of said resultant train of lower amplitude than said multiple-unit radix amplitude or a multiple of said multiple-unit radix amplitude, means controlled by said threshold circuit for amplifying to a uniform amplitude at least equal to radix level those of the transmitted pulses of amplitudes at least equal to radix amplitude, through an amplifier tube discriminating against lower amplitude pulses, an output circuit having an input mixer, two resistors in parallel in the output of said tube, one of these resistors being of such a value as to reduce to a unit amplitude said higher than radix uniform amplitude pulses and being connected to said input circuit for applying thereto said unit-amplitude time shifted pulses, the other of said resistors being of such a value to reduce to radix amplitude said higher than radix uniform amplitude pulses and being connected to said input mixer of said output circuit, means for applying to said input mixer said resultant pulse train, and said output circuit comprising means for subtracting said radix amplitude pulse train from said resultant pulse train.

3. A carry-over operator for the conversion of an incorrectly coded train of number-representative pulses having a plurality of amplitudes not higher than twice a radix minus one amplitude, comprising an input circuit including means for adding an incoming pulse train and a carry-over unit-amplitude pulse train having a time shift equal to a period of the incoming pulses for the pulses of said carry-over pulse train, to produce a resultant pulse train of added impulses, and an output circuit including means for subtracting from said resultant train a cancellation pulse train of radix amplitude to produce an outgoing pulse train of subtracted amplitudes, a connection between the output of said input circuit and said output circuit for applying said resultant pulse train to said output circuit, an amplifier tube branched off of said connection, said amplifier tube being so biased as to discriminate against pulses of said resultant train of lower amplitude than radix amplitude and delivering pulses of a uniform amplitude higher than said multiple-unit radix amplitude, a first resistor connected to the plate of said amplifier tube of such a value as to reduce the amplitude of the pulses of the train issuing from said tube to a unit amplitude and being connected to the input of said input circuit, and a second resistor connected to the plate of said amplifier tube of such a value as to reduce the amplitude of the pulses of the train issuing from said tube to a radix amplitude, and being connected to the input of said output circuit.

4. A carry-over circuit arrangement, for the conversion of an incoming train of incorrectly coded number-representative pulses of both polarities in the binary system of numeration, comprising an input circuit for adding said incoming train to a carry-over unit-amplitude pulse train to produce a resultant train, an amplifier stage connected to said input circuit for amplifying to an arbitrary value higher than a multiple-unit radix amplitude those pulses of said resultant train of amplitudes equal to or higher than said multiple unit radix amplitude, a voltage drop resistor connecting the output of said amplifier stage to said input circuit and supplying said carry-over pulse train to said input circuit, a second voltage drop resistor in the output of said stage for deriving therefrom a cancellation train of pulses of reduced amplitude, a circuit for transferring the train issuing from said input circuit to an output circuit, means applying said cancellation pulse train to said output circuit to be subtracted from said transferred train, polarity responsive means in both said input and output circuits responding to the polarity of the incoming pulses of said incoming pulse train and said transferred pulse train, respectively, and inverting all pulses of negative polarity and applying said inverted pulse to their output circuits both at the time of receipt of the negative pulse and at a time interval delayed by a period of the pulses of said trains.

References Cited in the file of this patent

UNITED STATES PATENTS

| Number | Name | Date |
|---|---|---|
| 2,429,227 | Herbst | Oct. 21, 1947 |

OTHER REFERENCES

"Radar Electronic Fundamentals," Navships 900,016, Bureau of Ships, Navy Dept., 1944; page 170.